United States Patent [19]

Reed

[11] 4,045,357

[45] Aug. 30, 1977

[54] HYDROXY-ALUMINUM BASED DRILLING FLUID

[75] Inventor: Marion G. Reed, Hacienda Heights, Calif.

[73] Assignee: Chevron Research Company, San Francisco, Calif.

[21] Appl. No.: 725,807

[22] Filed: Sept. 23, 1976

Related U.S. Application Data

[63] Continuation-in-part of Ser. No. 574,810, May 5, 1975, abandoned.

[51] Int. Cl.$^2$ .................................................. C09K 7/02
[52] U.S. Cl. .................................. 252/8.5 A; 175/72; 252/8.5 B
[58] Field of Search ............. 252/8.5 A, 8.5 B, 8.5 C, 252/8.55 R; 166/305; 175/72

[56] References Cited

U.S. PATENT DOCUMENTS

| 3,025,234 | 3/1962 | Canterino | 252/8.5 |
|---|---|---|---|
| 3,077,454 | 2/1963 | Monroe et al. | 252/392 X |
| 3,603,399 | 9/1971 | Reed | 166/305 R |
| 3,762,485 | 10/1973 | Chesser et al. | 252/8.5 X |
| 3,827,500 | 8/1974 | Reed | 166/305 |
| 3,833,718 | 9/1974 | Reed et al. | 252/8.55 X |
| 3,843,524 | 10/1974 | Perricone et al. | 252/8.5 X |
| 3,872,018 | 3/1975 | Alexander | 252/8.5 |

*Primary Examiner*—Herbert B. Guynn
*Attorney, Agent, or Firm*—R. L. Freeland, Jr.; Edward J. Keeling

[57] ABSTRACT

The disclosure provides an aqueous hydroxy-aluminum drilling fluid having a ratio of hydroxy groups to aluminum atoms in the range of from 1.0 to 2.7 and a concentration of at least 0.5 molar and including an effective amount of a polymer selected from the group consisting of polyvinylpyrrolidone and polyvinyl alcohol and a corrosion inhibitor.

3 Claims, No Drawings

HYDROXY-ALUMINUM BASED DRILLING FLUID

RELATED PATENTS

This application is a continuation-in-part of application Ser. No. 574,810, filed May 5, 1975, by MARION G. REED, for HYDROXY-ALUMINUM BASED DRILLING FLUID, now abandoned.

This application is related to U.S. Pat. No. 3,603,399, issued Sept. 7, 1971, for FORMATION PERMEABILITY MAINTENANCE WITH HYDROXY-ALUMINUM SOLUTIONS; U.S. Pat. No. 3,827,495, issued Aug. 6, 1974, for SAND STABILIZATION AND SELECTED FORMATIONS; and U.S. Pat. No. 3,827,500, issued Aug. 6, 1974, for FORMATION PERMEABILITY MAINTENANCE WITH HYDROXY-ALUMINUM SOLUTIONS. The contents of these patents are incorporated herein by reference.

FIELD OF THE INVENTION

This invention relates to a drilling fluid useful in drilling into earth formations containing shales which tend to become unstable when contacted by aqueous drilling fluids. An aqueous hydroxy-aluminum solution having a ratio of hydroxyl groups to aluminum atoms in the range of 1.0 to 2.7 and a concentration of at least 0.5 molar is provided with an effective amount of a polymer for adjusting the viscosity of the solution. An effective amount of a corrosion inhibitor compatible with the hydroxy-aluminum solution is incorporated in the drilling fluid to reduce corrosion. The hydroxy-aluminum drilling fluid permits drilling through unstable shales with a minimum of sloughing and erosion problems because the hydroxy-aluminum solution tends to stabilize the clays contained in the shale to assist in maintaining the shale in place during the drilling operation.

BACKGROUND OF THE INVENTION

In well drilling operations, shale containing formations are sometimes encountered in which conventional aqueous drilling muds are difficult or impossible to use because the aqueous portion of the drilling mud reacts with clays in the shale to cause shale erosion, caving, and extrusion into the well bore. In extreme occurrences, the shale extrudes into the drilled borehole and presses against the drill string, making drilling difficult or impossible. Various methods, including air drilling, wax emulsion drilling, and the use of oil-based drilling fluids, have been used to counteract the problem. There is, however, need for an aqueous drilling fluid useful in drilling through such unstable shales.

BRIEF DESCRIPTION OF THE INVENTION

The present invention provides a hydroxy-aluminum based drilling fluid for use in drilling through unstable shale-containing formations. The drilling fluid comprises an aqueous hydroxy-aluminum solution having a ratio of a hydroxyl group to aluminum atoms in the range of from 1.0 to 2.7, and a concentration of at least 0.5 molar, an effective amount of a polymer selected from the group consisting of polyvinylpyrrolidone ("PVP") and polyvinyl alcohol ("PVA") and an effective amount of a corrosion inhibitor. The drilling fluid is circulated through the drill string and up the borehole annulus and the hydroxy-aluminum in the fluid stabilizes the water-sensitive clays in the shale to substantially prevent shale instability.

OBJECT OF THE INVENTION

It is a particular object of the present invention to provide a drilling fluid useful in drilling through an unstable shale formation. Further objects and advantages of the present invention will become apparent from reading the following detailed description of the invention.

DETAILED DESCRIPTION OF THE INVENTION

The present invention provides an aqueous hydroxy-aluminum drilling fluid containing a polymer for controlling the viscosity of the solution, and a corrosion inhibitor for reducing corrosion of the drill string and other metal equipment contacted while drilling with the solution. The hydroxy-aluminum solution, as noted in the above-cited related patents, reacts with the clays in a shale formation to stabilize the clay in the shale to prevent swelling, softening and sloughing of the shale into the well. Depending on the temperature of the well in which the aqueous hydroxy-aluminum drilling fluid is used, the ratio of the hydroxyl groups to the aluminum atoms will vary. When aluminum salt solutions such as hydroxy-aluminum chloride are heated, the water molecules tend to dissociate more and thus provide more hydroxyl groups for polymerization of hydroxyl-aluminum. Thus, raising the temperature increases the OH/Al ratio in the polymer structure without addition of base. The effect of increased temperature may be counteracted by starting with a solution having a lower OH/Al ratio. In the case of very high temperatures, i.e., greater than perhaps 300° F, solutions with OH/Al ratios as low as 1.0 to 2.0 are necessary to prevent precipitation or gelation.

In wells where the temperature is less than about 180° F, it is preferred to use hydroxy-aluminum solution with a ratio of hydroxyl groups to aluminum atoms of from 2.7 to 1.0, and preferably a ratio of hydroxyl groups to aluminum atoms should be maintained between 2.0 and 2.5. When the temperature which will be encountered is above 180° F and up to 250° F, the ratio of the hydroxyl groups to the aluminum atoms should be maintained at a value of 2.2, or less. Thus, preferably, the ratio of the hydroxyl groups to aluminum atoms in wells having a temperature in excess of 180° F should be maintained at a value between 2.2 and 1.0. The concentration of the hydroxy-aluminum solution should be maintained at a concentration of at least 0.5 molar. Preferably the concentration of the hydroxy-aluminum solution should be maintained at 1 molar or higher.

A polymer is added to the aqueous hydroxy-aluminum solution to adjust the viscosity of the solution to a desired value. The viscosity of the solution is adjusted according to the need to carry cuttings up the borehole and to limit the rate of fluid loss to the formation. The polymer must be thermally stable at bottom hole temperatures and compatible with the hydroxy-aluminum solution. It has been found that anionic polymers react with the hydroxy-aluminum and are not suitable for use in the present invention. Only certain cationic and nonionic polymers are useful in accordance with the present invention. Of some 22 various polymers tested, only two proved satisfactory at the high temperatures. The two satisfactory thermally stable compatible polymers for use in the aqueous hydroxy-aluminum drilling fluid at higher well temperatures are polyvinylpyrrolidine and polyvinyl alcohol. The amount of either of these polymers in the aqueous hydroxy-aluminum drilling solution will vary depending upon the need to carry cuttings from a given borehole and to limit fluid loss to the formation. Concentrations of from 0.1 to 5% of either of these polymers have been found useful. A concentration of 2.5% by weight based on the total solution weight is preferred in many operations. At lower temperatures such as less than 120° F other polymers such as hydroxy ethyl cellulose can be used satisfactorily for viscosity control.

A corrosion inhibitor is added to the hydroxy-aluminum drilling fluid to prevent excessive corrosion of the drill string and other metallic parts of the drilling rig. This is particularly necessary at higher temperatures, as for example, in excess of 150° F. A large number of corrosion inhibitors were tested for compatibility with the hydroxy-aluminum solution and the ability to prevent corrosion. The most superior corrosion inhibitor tested for use in this drilling fluid is a product of the Dow Chemical Company and was sold under the trademark of DOWELL A-110. This product has been changed slightly by replacing some of the water with alcohol and it is now being sold under the trademark of DOWELL A-130. The active ingredient in DOWELL A-110 and DOWELL A-130 is an amine. Depending on the temperatures expected to be encountered, an effective amount of the corrosion inhibitor is added to the hydroxy-aluminum drilling fluid. In many instances, about 0.25% by weight will constitute an effective amount for limiting corrosion of the drilling equipment to an acceptable rate. The amine type of corrosion inhibitor useful in the present invention is a polyalkyl substituted nitrogen containing heterocyclic compound. DOWELL A-110 and DOWELL A-130 are amine corrosion inhibitors of this type. U.S. Pat. No. 3,077,454, issued Feb. 12, 1963 to Roger F. Monroe et al as assignors to the Dow Chemical Company, describes methods of preparing these types of amines. The disclosure of U.S. Pat. No. 3,077,454 is hereby incorporated by reference.

In some instances, it is desirable to incorporate other additives into the aqueous hydroxy-aluminum drilling fluid. For example, it is sometimes desirable to add barite to the hydroxy-aluminum drilling fluid to weight up the fluid for use where high pressure formations may be encountered.

Suitable hydroxy-aluminum drilling fluids have been formulated and various tests have been run on these fluids. In order to determine the effectiveness of hydroxy-aluminum drilling fluid, the rheological properties of the fluid and the rates of corrosion of steel in the fluid are measured. Additional tests were made on the fluid samples in order to select the most desirable combination for operational use.

Example I sets out the typical standard procedure for formulating a hydroxy-aluminum drilling mud.

EXAMPLE I

A suitable hydroxy-aluminum drilling fluid was formulated in a lab demonstration.

Hydroxy-aluminum from a commercial source (Reheis Chemical Company, WT4) was about 6 molar aluminum and its OH/Al ratio was about 2.5. A concentration of 0.5 molar aluminum (1 part WT4 — 11 parts water) is effective in stabilizing shales and an OH/Al ratio of about 2.0 has an improved high temperature stability.

The following procedure will convert six molar hydroxy-aluminum to a solution about 0.5 molar aluminum and an OH/Al ratio of about 2.0:

1. Place 83 ml of 6 molar hydroxy-aluminum in a 1-liter volumetric flask (pH = 3.2–3.6).
2. Dilute to approximately 800 ml with distilled water while stirring. The distilled water is not required for field systems. It is used in laboratory formulations for standardization.
3. Add 21.6 ml concentrated (39%) hydrochloric acid and stir for 5 minutes.
4. Add for viscosity control 25 gms polyvinylpyrrolidone powder (K-90 from GAF Corporation) and stir until the polymer is completely dissolved and the fluid is uniform and fairly clear in appearance.
5. Add for corrosion control 2.5 gms of DOWELL A-130 corrosion inhibitor.
6. Fill flask to 1-liter mark with distilled water, and stir for 5 minutes. The fluid should stand for 24 hours before it is used in order that the hydroxy-aluminum polynuclear structures will have time to equilibrate after the acid addition. (Final pH = 3.6–3.9.)

Table I below illustrates the rheological properties of typical hydroxy-aluminum drilling fluids. One molar hydroxy-aluminum solutions containing polyvinylpyrrolidone and 0.25% by weight of a corrosion inhibitor (DOWELL A-110) were tested by apparent viscosity, plastic viscosity, yield point, and 10-minute gel strength, both with and without barite using a Fann viscometer. The results indicate that these fluid systems have rheologies that are frequently useful for drilling earthen formations. The results also indicate that the addition of barite as a weighting material does not adversely affect the rheology of the hydroxy-aluminum drilling fluid providing polymer additions are adjusted to compensate for the thickening effect of barite.

TABLE I

RHEOLOGICAL PROPERTIES OF TYPICAL OH-Al DRILLING MUDS USING A FANN VISCOMETER

| | Apparent Vis. (CP) | Plastic Vis. (CP) | Yield Point #/100 Ft$^2$ | 10 Min. Gel Strength #/100 Ft$^2$ |
|---|---|---|---|---|
| 1 M OH-Al 3.9% PVP 0.25% Dowell A-110 w/o Barite | 47 | 42 | 10 | 2 |
| 1 M OH-Al 2.4% PVP 0.25% Dowell A-110 w/Barite (12 #/gal mud) | 45 | 42 | 6 | 1 |

Table II shows the effect of a corrosion inhibitor in the hydroxy-aluminum drilling mud at various temperatures and concentrations. It is noteworthy that if the temperature increases, i.e., to 144° F, the corrosion can be maintained at acceptable rates only by the addition of a corrosion inhibitor.

TABLE II

EFFECTS OF TEMPERATURE, OH/Al, AND INHIBITOR ON RATES OF CORROSION ON MILD STEEL BY OH-Al SOLUTION

| | | Corrosion Rates (Mils/yr)** | |
|---|---|---|---|
| Temp. | OH/Al | With Dowell A-110* | Without Dowell A-110 |
| 72° F | 2.0 | 9.0 | 19.9 |
| | 2.2 | 11.2 | 20.0 |
| 144° F | 2.0 | 15.7 | 146 |
| | 2.2 | 8.9 | 244 |
| 210° F | 2.0 | 13.4 | 3107 |

TABLE II-continued
EFFECTS OF TEMPERATURE, OH/Al, AND INHIBITOR ON RATES OF CORROSION ON MILD STEEL BY OH-Al SOLUTION

| | | Corrosion Rates (Mils/yr)** | |
|---|---|---|---|
| Temp. | OH/Al | With Dowell A-110* | Without Dowell A-110 |
| | 2.2 | 24.4 | 2029 |

*0.25% by weight
**Extrapolation of 3 hr corrosion rates on mild steel coupons under static conditions with air included.

Table III shows the effect of temperatures and hydroxy-aluminum ratio on hydrolysis of 1 molar hydroxy-aluminum solutions. For the higher temperatures, i.e., 250° F, it is noted that the hydroxy-aluminum ratio should be maintained below 2.2. It is also indicated that the hydroxy-aluminum drilling fluid with OH/Al ratios as low as 2.0 should not be used where temperatures in excess of 300° F are expected to be encountered.

TABLE III
EFFECT OF TEMPERATURE AND OH/Al RATIO ON HYDROLYSIS OF 1M OH-Al SOLUTIONS

| Temp. | Time | OH/Al Ratio | | | | | |
|---|---|---|---|---|---|---|---|
| | | 2.0 | 2.1 | 2.2 | 2.3 | 2.4 | 2.5 |
| | days | | | | | | |
| 180° F | 4 | C | C | C | C | C | C |
| | 21 | C | C | C | C | C | P |
| | 90 | C | — | C | — | — | — |
| 250° F | 4 | C | C | C | SP | P | P |
| | 21 | C | C | C | SP | P | P |
| | 90 | SP | SP | — | — | — | — |
| 320° F | 4 | P | P | P | P | P | P |
| | 21 | P | P | P | P | P | P |

C - Clear
SP - Slight Precipitate
P - Precipitate

Table IV shows the results of shale stability tests in various fluid formulations. It is clear that the hydroxy-aluminum drilling muds are far superior to other fluids shown. It is also indicated that the hydroxy-aluminum concentration should be at least 0.5 molar. The shale erosion test was made by (1) compressing a known unstable oil field shale into a 0.5-inch diameter by 1-inch long cylinder, (2) placing the cylinder into a capped round pint jar two-thirds filled with the test fluid, and (3) placing the jar on motor driven rollers which cause the shale cylinder to smoothly roll through the test fluid on the side of the jar. The time it took the shale pellets to totally disintegrate was recorded. Compressive strength measurements were made on samples which were prepared exactly the same way but were left static, that is not rolled, prior to the measurements. The compressive strength measurements were made up using an Instron universal testing instrument. The water contents shown in Table IV are for the pellets used in the 11-day compressive strength measurements.

All data shown in Table IV are averages of duplicate measurements.

TABLE IV
SHALE STABILITY TESTS

| Fluid Formulation | Erosion Test (Hours to Total Disintegration) | Compressive Strength (PSI) | | | Water Contents After 11 days (%) |
|---|---|---|---|---|---|
| | | 5 days | 11 days | 18 days | |
| Deionized Water | 1.4 | D | D | D | — |
| 1N NaCl | 6.2 | 1.4 | P | D | 42 |
| 1N CaCl₂ | 4.4 | 2.4 | P | P | 36 |
| 1N KCl | 4.4 | 2.1 | P | P | 35 |
| 1 M OH-Al, 2.5% PVP, 0.25% A110 | >720. | 29. | 79. | 43. | 28 |
| 0.5 M OH-Al, 2.5% PVP, 0.25% A110 | >720. | 30. | 59. | 77. | 28 |
| 0.1 M OH-Al, 2.5% PVP, 0.25% A110 | — | 7.8 | P | P | 34 |
| 2.5% PVP, 0.25% A110 | 7.1 | P | P | P | 38 |
| 1 M OH-Al, 2.5% PVA, 0.25% A110 | >720. | 52. | 67. | 83. | 26 |
| 0.5 M OH-Al, 2.5% PVA, 0.25% A110 | >720 | 23. | 64. | 62. | 28 |
| 0.1 M OH-Al, 2.5% PVA, 0.25% A110 | — | 5.4 | 6.5 | P | 36 |
| 2.5% PVA, 0.25% A110 | — | P | P | P | 38 |
| No treatment | — | P | P | P | 28 |

D - Disintegrated
P - Deformed Plastically

Table V shows the effect of added shale on apparent viscosity of hydroxy-aluminum based drilling fluid.

TABLE V
EFFECT OF ADDED SHALE ON APPARENT VISCOSITY OF HYDROXY-ALUMINUM BASED DRILLING FLUID

| | Apparent Viscosity (600 RPM FANN/2) | |
|---|---|---|
| Added Shale (gms shale/100 ml fluid) | 1 M OH-Al, 3.75% PVP, 0.15% A110 | 1 M OH-Al, 3.75% PVA, 0.25% A110 |
| 0 | 43 | 38 |
| 5 | 46 | 32 |
| 10 | 48 | 30 |
| 15 | 50 | 27 |
| 20 (Before centrifuging) | 50 | 24 |
| 20 (After centrifuging)* | 28 | 14 |

*The centrifuged fluid was subsequently used in corrosion tests using mild steel coupons at 200° F for 3 hours. Corrosion rates for PVP and PVA fluids were 478 and 745 mils per year, respectively, indicating that

TABLE V-continued
EFFECT OF ADDED SHALE ON APPARENT VISCOSITY OF HYDROXY-ALUMINUM BASED DRILLING FLUID

| | Apparent Viscosity (600 RPM FANN/2) | |
|---|---|---|
| Added Shale (gms shale/100 ml fluid) | 1 M OH-Al, 3.75% PVP, 0.15% A110 | 1 M OH-Al, 3.75% PVA, 0.25% A110 | remaining shale which has contacted the fluid also removes corrosion inhibitor. This inhibitor would have to be added in the field to compensate for losses to drilled solids.
Aluminum determinations on the centrifuged fluid show that the shale also removed from solution about one millimole of Al per gram of shale.

Note in Table V that apparent viscosity does not change markedly on addition of shale, especially in the case of polyvinylpyrrolidone. However, on removing the shale, there was significant decrease in viscosity. Apparently, the usual thickening effect of added solids is counteracted by the shale tying up some of the polymer. This means that polymer would probably have to be added as drilled solids are removed from the drilling fluid.

In summary, the present invention provides a drilling fluid useful in drilling earth formations containing unstable shale. An aqueous hydroxy-aluminum solution having a ratio of hydroxyl groups to aluminum atoms in the range of 1.0 to 2.7 and a concentration of at least 0.5 molar is provided with an effective amount of a polymer for adjusting the viscosity of the solution. An effective amount of a corrosion inhibitor compatible with the hydroxy-aluminum solution is incorporated in the drilling fluid to reduce corrosion. The hydroxy-aluminum drilling fluid permits drilling through unstable shale with a minimum of problems because the hydroxy-aluminum solution tends to stabilize the clays contained in the shale to assist in maintaining the shale in place during the drilling operation.

While only certain embodiments of the present invention have been described in detail, the invention is not meant to be limited by such embodiments but rather only by the scope of the appended claims.

What is claimed is:

1. An aqueous drilling fluid comprising an aqueous hydroxy-aluminum solution having a ratio of the hydroxyl groups to aluminum atoms in the range of from 1.0 to 2.7 and a concentration of at least 0.5 molar, from 0.1 to 0.5% by weight of a polymer selected from the group consisting of polyvinylpyrrolidone and polyvinyl alcohol for viscosity control and an effective amount of a polyalkyl substituted nitrogen containing heterocyclic compound for corrosion control.

2. An aqueous drilling fluid for use at temperatures of less than 180° F comprising an aqueous hydroxy-aluminum solution having a ratio of the hydroxyl groups to aluminum atoms in the range of from 2.0 to 2.5 and a concentration of at least 1 molar, from 0.1 to 0.5% by weight of a polymer selected from the group consisting of polyvinylpyrrolidone and polyvinyl alcohol for viscosity control and an effective amount of a polyalkyl substituted nitrogen containing heterocyclic compound for corrosion control.

3. An aqueous drilling fluid for use at temperatures above 180° F comprising an aqueous hydroxy-aluminum solution having a ratio of the hydroxyl groups to aluminum atoms in the range of from 1.0 to 2.2 and a concentration of at least 1 molar, from 0.1 to 0.5% by weight of a polymer selected from the group consisting of polyvinylpyrrolidone and polyvinyl alcohol for viscosity control and at least 0.25% by weight of a polyalkyl substituted nitrogen containing heterocyclic compound for corrosion control.

* * * * *